(12) United States Patent
Lee (10) Patent No.: US 7,827,422 B2
(45) Date of Patent: Nov. 2, 2010

(54) PORTABLE ELECTRONIC DEVICE HAVING DOUBLE-SIDE DISPLAY POWERED BY CORRESPONDING POWER SUPPLY

(75) Inventor: Jaesung Lee, Yongin-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 769 days.

(21) Appl. No.: 11/826,021

(22) Filed: Jul. 11, 2007

(65) Prior Publication Data

US 2008/0172569 A1 Jul. 17, 2008

(30) Foreign Application Priority Data

Jan. 17, 2007 (KR) .................. 10-2007-0005250

(51) Int. Cl.
*G06F 1/28* (2006.01)
(52) U.S. Cl. .................. 713/310; 713/324; 345/1.1; 307/38
(58) Field of Classification Search .......... 713/310, 713/324, 340; 345/1.1, 51, 52; 307/38; 349/1, 349/19
See application file for complete search history.

(56) References Cited

U.S. PATENT DOCUMENTS 6,762,436 B1 * 7/2004 Huang et al. .......... 257/82
7,507,993 B2 * 3/2009 Lee et al. ............... 257/59
2004/0075628 A1 * 4/2004 Chien et al. ............ 345/82
2004/0263064 A1 * 12/2004 Huang .................. 313/504
2005/0110403 A1 * 5/2005 Han et al. .............. 313/512
2007/0109290 A1 * 5/2007 Lee ...................... 345/211

FOREIGN PATENT DOCUMENTS

| KR | 10-2005-0080411 | 8/2005 |
| KR | 10-2005-0104077 | 11/2005 |
| KR | 10-2006-0017199 | 2/2006 |
| KR | 10-2006-0044191 | 5/2006 |

* cited by examiner

*Primary Examiner*—Thuan N Du
(74) *Attorney, Agent, or Firm*—Robert E. Bushnell, Esq.

(57) ABSTRACT

A portable display device comprises: a first panel emitting light in a first direction; a second panel emitting light in a second direction; a substrate disposed between the first panel and the second panel; a first power supply unit applying a power supply voltage to the first panel; a second power supply unit applying a power supply voltage to the second panel; a switch control unit selectively controlling the first power supply unit and the second power supply unit; a first positive power supply voltage unit electrically coupled to the first power supply unit and applying a positive power supply voltage to the first panel; a second positive power supply voltage unit electrically connected to the second power supply unit and applying a positive power supply voltage to the second panel; a first negative power supply voltage unit electrically coupled to the first power supply unit and applying a negative power supply voltage to the first panel; and a second negative power supply voltage unit electrically connected to the second power supply unit and applying a negative power supply voltage to the second panel.

15 Claims, 6 Drawing Sheets

PORTABLE ELECTRONIC DEVICE HAVING DOUBLE-SIDE DISPLAY POWERED BY CORRESPONDING POWER SUPPLY

CLAIM OF PRIORITY

This application makes reference to, incorporates the same herein, and claims all benefits accruing under 35 U.S.C. §119 from an application for PORTABLE ELECTRONIC DEVICE earlier filed in the Korean Intellectual Property Office on the 17$^{th}$ day of January 2007 and there duly assigned Serial No. 10-2007-0005250.

BACKGROUND OF THE INVENTION

1. Technical Field

The present invention relates to a portable electronic device and, more particularly, to a portable electronic device including a switch control unit for controlling power supply units that drive two display panels so as to selectively drive the respective display panels.

2. Related Art

Recently, there are frequent occasions where at least two displays are included in a mobile phone, a portable multimedia player, a portable game player, a PDA, a notebook, etc. In such a case, one display is provided as a main display having a relatively large size and the other display having a relatively small size is used for providing auxiliary information or provided in terms of design.

In the case where at least two displays are applied thereto, since it is not easy to control the drive between the displays, there are frequent occasions where the operation of one display interferes with that of the other display and thereby a user feels inconvenience.

Moreover, in the case where at least two displays are used, there arises a problem in that it is not easy to control the respective drives due to the use of different kinds of displays, such as a combination of an organic light emitting display and a liquid crystal display. To drive the different kinds of displays, it is required to adopt a complicated circuit. Accordingly, this increases the manufacturing cost, causes malfunctions due to the complicated circuit, and thereby deteriorates the operation reliability. Such problems still occur in the case where the same kinds of displays are used. Of course, although there are less problems in the case of displays having the same operation conditions, such as the same kind, the same size, the same resolution and the like, it is an extremely rare case where at least two displays having the same conditions are used. Accordingly, the solution of the problems as described above still remains as an important issue.

SUMMARY OF THE INVENTION

Accordingly, an object of the present invention is to provide a portable electronic device including a switch control unit for controlling power supply units that drive two display panels so as to selectively drive the respective display panels.

Another object of the present invention is to provide a portable electronic device that includes a selection circuit for selectively driving switch control units and which varies the input of the selection circuit, thus facilitating the use of two display panels.

Still another object of the present invention is to provide a portable electronic device that selectively uses two switch control units or applies a single switch control unit according to an application environment of the panel.

A further object of the present invention is to provide a portable electronic device that makes it possible to select and use a most suitable panel according to use conditions by proposing luminescent methods of display panels and fabricating methods thereof in detail.

To accomplish the above objects, there is provided a portable electronic device in accordance with the present invention including: a first panel emitting light in a first direction; a second panel emitting light in a second direction; a substrate disposed between the first panel and the second panel; a first power supply unit applying a power supply voltage to the first panel; a second power supply unit applying a power supply voltage to the second panel; a switch control unit selectively controlling the first power supply unit and the second power supply unit; a first positive power supply voltage unit electrically coupled to the first power supply unit and applying a positive power supply voltage to the first panel; a second positive power supply voltage unit electrically connected to the second power supply unit and applying a positive power supply voltage to the second panel; a first negative power supply voltage unit electrically coupled to the first power supply unit and applying a negative power supply voltage to the first panel; and a second negative power supply voltage unit electrically connected to the second power supply unit and applying a negative power supply voltage to the second panel; wherein any one of the first panel and the second panel is an organic light emitting diode, and wherein the first negative power supply voltage unit and the second negative power supply voltage unit are electrically coupled to each other.

The switch control unit may include a first switch control unit independently controlling the first power supply unit, and a second switch control unit independently controlling the second power supply unit.

A selection circuit selecting the first switch control unit and the second switch control unit may be further electrically coupled to the first switch control unit and the second switch control unit.

The selection circuit may select any one of the first switch control unit and the second switch control unit according to a selection order from a user.

A direction detection unit detecting a light-emitting direction of any one of the first panel and the second panel may be further included.

The selection circuit may select any one of the first switch control unit and the second switch control unit according to an output of the direction detection unit.

A first body and a second body connected to the first body by a shaft may be included, the first body and the second body may be rotated by the shaft so as to be folded together, and any one of the first panel and the second panel may be established on the first body so that the light-emitting direction is toward the surface where the first body and the second body are folded together.

Any one of the first body and the second body may further include a closing detection unit detecting the closing of the first body and the second body.

The selection circuit may select any one of the first switch control unit and the second switch control unit according to an output of the closing detection unit.

The material of an emitting layer of the organic light emitting diode may be a fluorescent material.

The material of an emitting layer of the organic light emitting diode may a phosphorescent material.

At least one polycrystalline thin film transistor for driving the organic light emitting diode may be included.

The polycrystalline thin film transistor may be formed by a laser crystallization method.

The polycrystalline thin film transistor may be established by a metal induced crystallization method.

The polycrystalline thin film transistor may be provided by a high-pressure annealing method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Above and beyond the above-mentioned objects, other features and advantages of the present invention will become readily apparent through the detailed description of the preferred embodiments with reference to the accompanying drawings. The detailed description disclosed hereinafter with reference to the accompanying drawings is made with the intent to explain the preferred embodiments of the present invention; however, it does not limit the forms in which the present invention is embodied. That is, the invention may be embodied in many different forms and should not be construed as limited to the embodiments set forth herein; rather, these embodiments are provided so that this disclosure will be thorough and complete, and will fully convey the scope of the invention to those having skill in the art.

Some features depicted in the drawings have been enlarged for the sake of convenience in providing an explanation, and the drawings and the elements may not be depicted in an appropriate ratio; however, those having ordinary skill in the art will readily appreciate these and other details.

Hereinafter, the preferred embodiments of the present invention will be described in detail with reference to the accompanying drawings.

Figure 1:
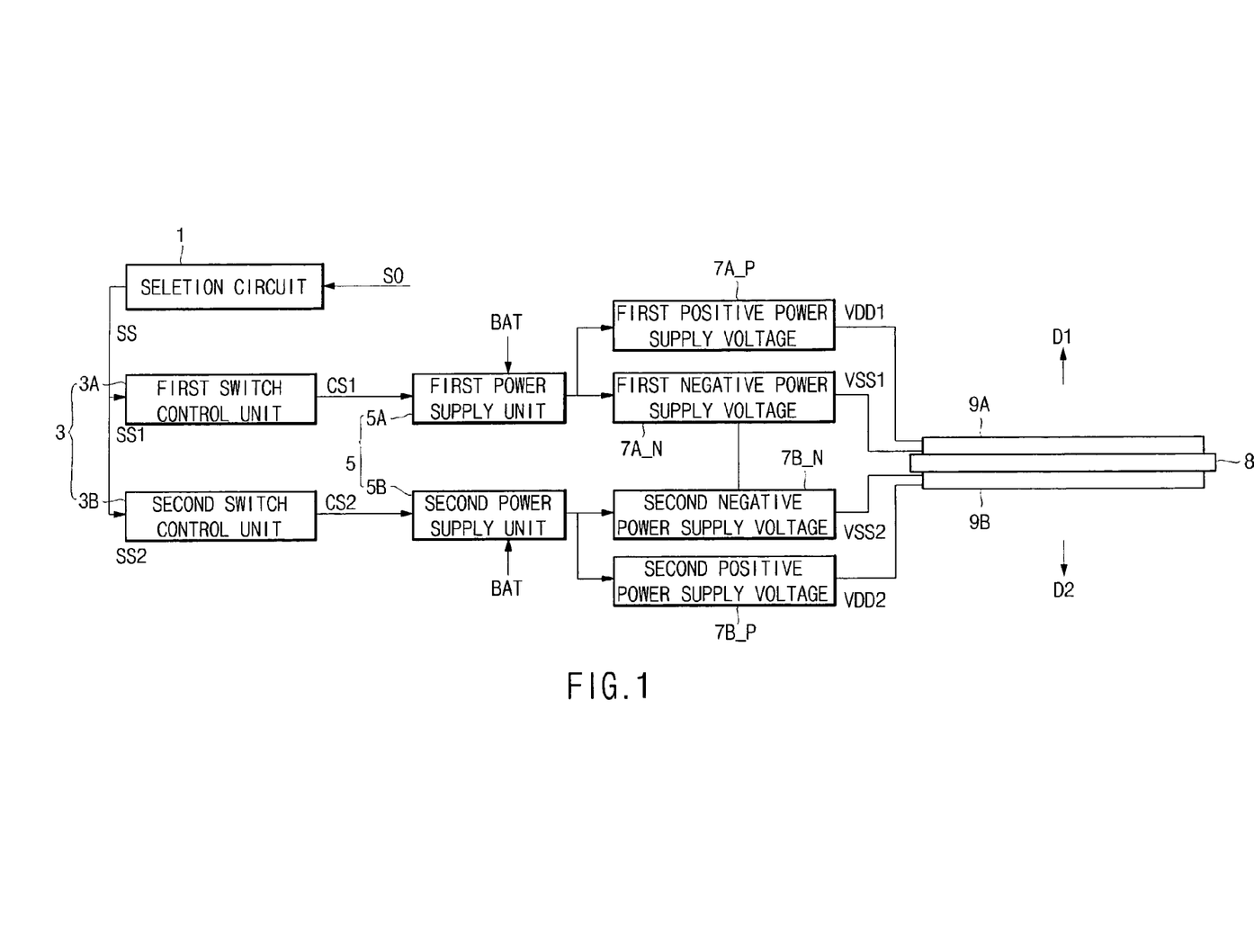
FIG. 1 is a diagram depicting a configuration of a portable electronic device in accordance with a preferred embodiment of the present invention.

FIG. 1 is a diagram depicting a configuration of a portable electronic device in accordance with a preferred embodiment of the present invention.

Referring to FIG. 1, the portable electronic device 10 in accordance with the present invention includes a selection circuit 1, a first switch control unit 3A, a second switch control unit 3B, a first power supply unit 5A, a second power supply unit 5B, a first positive power supply voltage 7A_P, a first negative power source voltage 7A_N, a second positive power supply voltage 7B_P, a second negative power supply voltage 7B_N, a first panel 9A, a second panel 9B and a substrate 8.

The selection circuit 1 selectively drives the first switch control unit 3A and the second switch control unit 3B based on a selection order SO. Here, the selection order SO may be a user's command input through an input means or an output from a detection unit; however, the present invention is not limited thereto. Detailed examples of the detection unit will be described henceforth. If the selection order SO is input, the selection circuit 1 transmits operation signals SS (SS1 and SS2) to the first switch control unit 3A and the second switch control unit 3B, respectively, so that the switch control units 3 (3A and 3B) are operated. The operation signal SS may be a signal for turning off all of the first and second switch control units 3A and 3B, a signal for operating one of them, or a signal for operation all of them.

The switch control unit 3 selectively controls the first power supply unit 5A and the second power supply unit 5B to supply power required for driving the first panel 9A and the second panel 9B. To this end, the switch control unit 3 is composed of the first control unit 3A and the second control unit 3B as depicted in FIG. 1. The switch control unit 3 is driven based on the operation signal SS from the selection circuit 1. In the case where the switch control unit 3 is applied to the inside of the portable electronic device, the switch control unit 3 may be used in the form of an integrated circuit IC; however, the present invention is not limited thereto. Moreover, the switch control unit 3 transmits power control signals CS (CS1 and CS2) for controlling the power supply units 5 (5A and 5B).

The power supply unit 5 supplies power from a power supply device, e.g., a battery BAT, to the power supply voltages 7 (7A_P, 7A_N, 7B_P and 7B_N). In particular, the power supply unit 5 is composed of the first power supply unit 5A and the second power supply unit 5B so as to supply power for driving the first panel 9A and the second panel 9B, respectively. If the voltage levels required for driving the first panel 9A and the second panel 9B are different from each other, the first and second power supply units 5A and 5B may boost or reduce the voltage of the power supplied from the power supply device to supply the power to the power supply voltage 7. To this end, the power supply unit 5 is controlled by a power control signal CS transmitted from the switch control unit 3.

In order to selectively drive the first panel 9A and the second panel 9B, the power supply voltage 7 is composed of the first positive power supply voltage 7A_P, the first negative power supply voltage 7A_N, supplying power to the first panel 9A, the second positive power supply voltage 7B_P, and the second negative power supply voltage 7B_N, supplying power to the second panel 9B. Here, in the case where the first panel 9A and the second panel 9B are composed of the same panel, e.g., the organic light emitting diode, or have the same operation voltage condition, the same operation current condition and an equivalent condition thereof, the first negative power supply voltage 7A_N and the second negative power supply voltage 7B_N may be electrically coupled to each other. Moreover, to selectively drive the first panel 9A and the second panel 9B, the first power supply voltages 7A_P and 7A_N supply a first positive voltage VDD1 and a first negative voltage VSS1 to the first panel 9A, and the second power supply voltages 7B_P and 7B_N supply a second positive voltage VDD2 and a second negative voltage VSS2 to the second panel 9B. For this purpose, the positive power supply voltages 7A_P and 7B_P may be embodied by a boost converter and the negative power supply voltages 7A_N and 7B_N may be realized by an inverter; however, the present invention is not limited thereto.

The panel 9 is composed of the first panel 9A and the second panel 9B driven by power supplied from the first power supply voltages 7A_P and 7A_N and the second power supply voltages 7B_P and 7B_N, respectively. The first panel 9A and the second panel 9B may be arranged to emit light in a light-emitting direction different from each other. That is, as depicted in FIG. 1, the first panel 9A and the second panel 9B may be arranged opposite to each other so that a first light-emitting direction D1 of the first panel 9A and a second light-emitting direction D2 of the second panel 9B are opposite to each other. However, various modifications are available and the present invention is not limited by the example of FIG. 1. The first panel 9A and the second panel 9B may be composed of the same display element, e.g., the organic light emitting diode. Moreover, in a different way, one of the first and second panel 9A and 9B may be composed of the organic light emitting diode OLED and the other may be formed using an inorganic light emitting diode or a liquid crystal display device LCD. Furthermore, the first panel 9A may use an active matrix AM method, the second panel 9B may apply a passive matrix PM method, and both panels 9A and 9B may use the AM method; however, the present invention is not limited thereto. In the case where the first panel 9A and the second panel 9B are configured using the same method or the same kind of display as depicted in FIG. 1, the substrate 8 may be integrated. Here, although the substrate 8 is depicted as integrated, it is also possible to form the first panel 9A and the second panel 9B on the respective substrates and then attach the substrates to one substrate 8; however, the present invention is not limited thereto. Moreover, the size or resolution of the first panel 9A and the second panel 9B may be different from each other.

Figure 2:
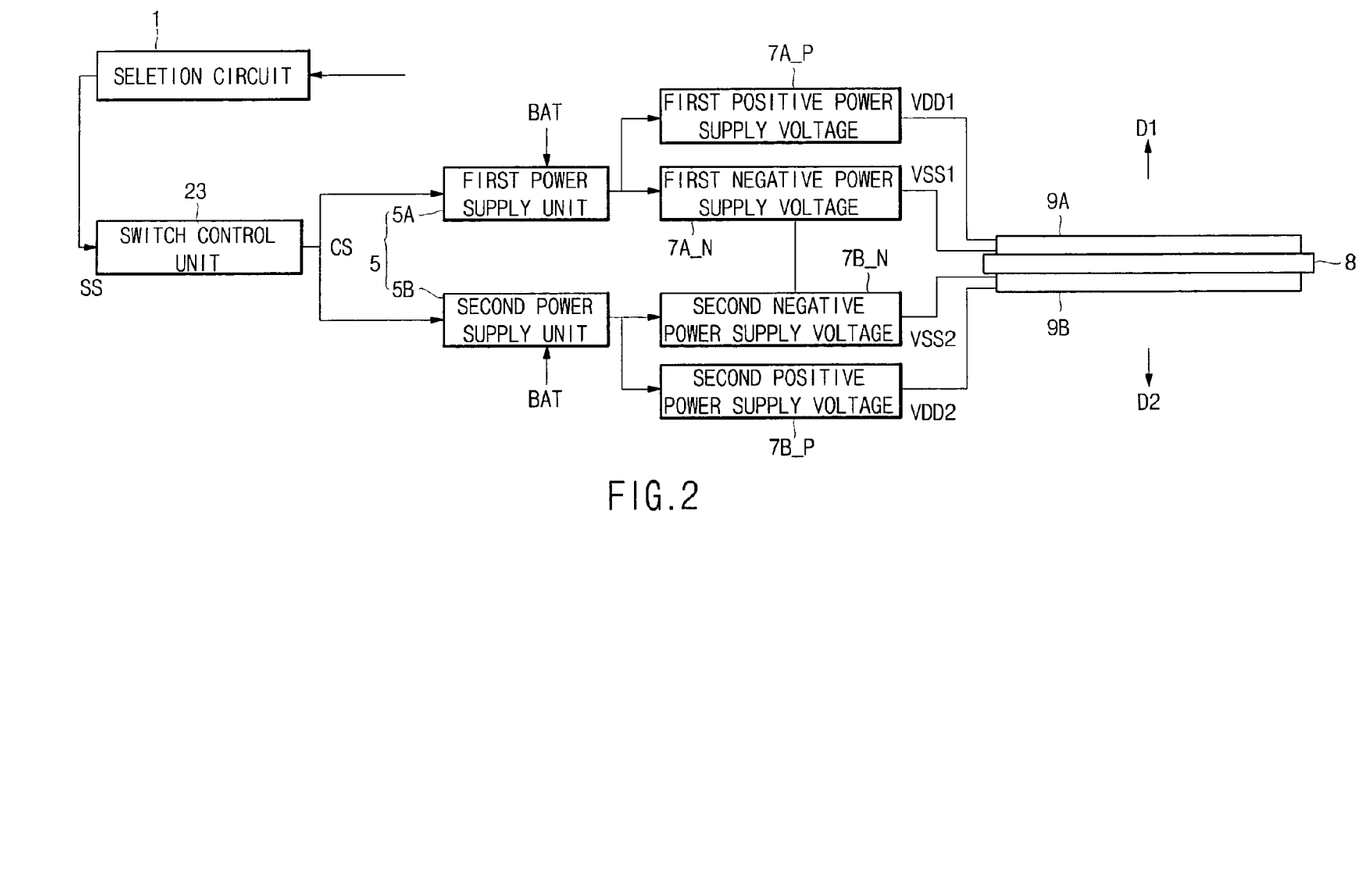
FIG. 2 is a diagram depicting a configuration of a portable electronic device in accordance with another embodiment of the present invention.

FIG. 2 is a diagram depicting a configuration of a portable electronic device in accordance with another embodiment of the present invention.

The embodiment depicted in FIG. 2 has a remarkable difference in that a switch control unit 23 is formed in a single body in contrast to FIG. 1. Elements having the same reference numerals have the same functions and characteristics as those described with reference to FIG. 1. Accordingly, the description of FIG. 2 will be made based on the differences from the previous embodiment. The switch control unit 23 performs the same operation as the switch control unit 3 of FIG. 1, except for the fact that the functions of the first switch control unit 3A and the second switch control unit 3B of FIG. 1 are realized by a single switch control unit 23 in FIG. 2. The single switch control unit 23 depicted in FIG. 2 selects the power supply unit 5 to be operated based on the selection signal SS from the selection circuit 1 and thereby selectively supplies the operation signal CS to the power supply unit 5. Accordingly, the selection signal SS from the selection circuit 1 and the control signal CS from the switch control unit 23 may be different signals from those in the previous embodiment. Since the configurations of the power supply unit 5, the power supply voltage 7 and the panel 9 are similar to those in FIG. 1, their detailed description will be omitted.

Figure 3A:
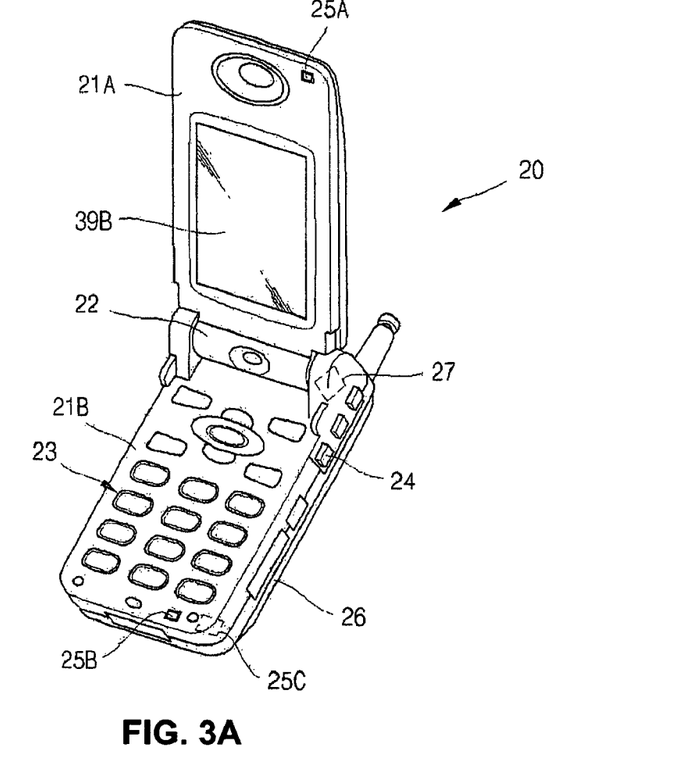
FIG. 3A is an exemplary diagram depicting a main display faced with a key pad in the case where a folder type mobile phone is folded.
Figure 3B:
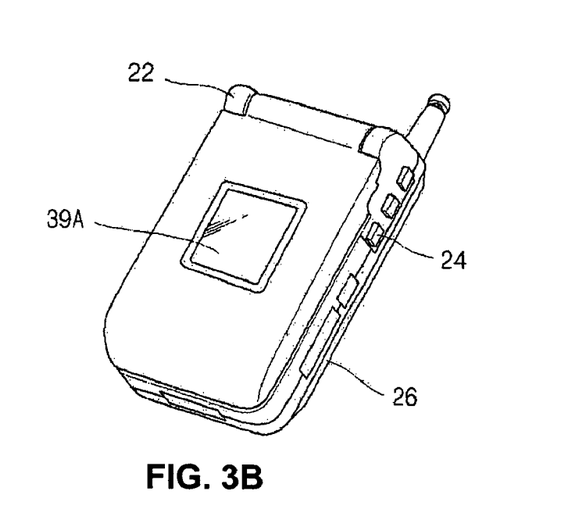
FIG. 3B is an exemplary diagram depicting an external display exposed to the outside in the case where a folder type mobile phone is folded.

FIGS. 3A and 3B are exemplary diagrams depicting actual application examples of FIGS. 1 and 2, in which the embodiments of FIGS. 1 and 2 applied to a folder type mobile phone are depicted exemplarily. That is, FIG. 3A depicts a main display faced with a key pad in the case where the folder type mobile phone is folded and FIG. 3B depicts an external display exposed to the outside in the case where the folder type mobile phone is folded.

Referring to FIGS. 3A and 3B, the embodiments depicted in FIGS. 1 and 2 can be applied to a mobile phone as depicted in FIGS. 3A and 3B. In the case where the embodiments of FIGS. 1 and 2 are applied to the mobile phone, it is possible to use the first panel 39A as the external display and the second panel 39B as the main display. Of course, the functions of the first panel 39A and the second panel 39B may be exchanged with each other; however, the present invention is not limited thereto.

As depicted in FIGS. 3A and 3B, the folder type mobile phone 20 is composed of a first body 21A and a second body 21B. The first and second bodies 21A and 21B, respectively, are rotatably connected to each other by a shaft 22. In the case of such a folder type mobile phone 20, a key pad 23 and an input key 24 are established on the second body 21B, and displays 39 (39A and 39B) are formed on the first body 21A. Here, the light-emitting direction of one of the displays 39A and 39B is faced with the key pad 23 of the second body 21B. Herein, the description will proceed on the assumption that the second panel 39B is closed toward the keypad 23 of the second body 21B. Like this, if the first body 21A and the second body 21B are folded together, the user cannot see the contents displayed on the second panel 39B and thereby the operation of the second panel 39B is suspended.

Describing the above with reference to FIGS. 1 and 2, the folding and the unfolding of the folder type mobile phone 20 are detected by measuring the rotational angle of the shaft 22 or by detecting whether or not contact points 25 (25A and 25B) established on the first body 21A and the second body 21B are in contact with other. Moreover, if a user pushes the input key 24 or if there is no input through the key pad for a predetermined time, the light emission can be stopped by suspending the operation of the panel 39. Furthermore, in the case of a notebook, the operation of the display may be controlled by an application program. That is, an output from a rotation detection sensor 27 measuring the rotational angle, an output from a contact sensor 25C detecting the contact between the contact points 25, an input signal through the input key 24, a signal applied from a central processing unit, not depicted, as time goes by, a signal generated by the program may be the selection order SO.

In particular, FIG. 3A depicts a closing detection unit detecting the closing of the first and second bodies 21A and 21B. The closing detection unit may be composed of the contact sensor 25C detecting the contact between the contact points 25 or a rotation detection sensor 27 detecting the rotation of the shaft 22; however, the present invention is not limited thereto.

The method of realizing the closing detection unit using the contact points 25 and the contact sensor 25C may be embodied using a pressure detection, an electric contact and an equivalent thereof. That is, if the first body 21A and the second body 21B are folded together, the first contact point 25A and the second contact point 25B are in contact with each other. Then, the contact sensor 25C detects a pressure increase, an electric flow and a resistance increase to confirm the closing of the first and second bodies 21A and 21B; however, the present invention is not limited thereto.

Moreover, the method using the rotation detection sensor 27 established at a point adjacent to the shaft 22 on the first body 21A or the second body 21B detects the closing based on the rotational angle of the shaft 22 detected by the rotation detection sensor 27. The method of detecting the rotation of the shaft 22 may be realized by using a physical contact, in which a concave-convex or a saw tooth is formed on the shaft and a sensor detects the movement thereof, or by using a measurement sensor such as an optical sensor. As such, if the folding or the unfolding of the first and second bodies 21A and 21B, respectively, is detected from the contact sensor 25C or the rotation detection sensor 27 that constitutes the closing detection unit, the output from the sensors 25C and 27 passes through the central processing unit of the portable electronic device 20 or is directly transmitted to the selection circuit 1 so as to control the operation of the first panel 39A and the second panel 39B. Here, the signal transmitted from the sensors 25C and 27 to the selection circuit 1 or the signal passing through the central processing unit may be the selection order SO.

If the selection order SO adopted by the above-described method is transmitted to the selection circuit 1, the selection circuit 1 selects the panels 9A and 9B to be driven based on the selection order SO. Then, the selection order SO from the selection circuit 1 is transmitted to the switch control unit 3 or 23, and thereby any one or all of the first and second panels 9A and 9B is driven or stopped. Here, the power for driving the panels 9A and 9B is supplied from the battery to the first power supply unit 5A and the second power supply unit 5B. Although FIGS. 3A and 3B depict the mobile phone 20 as an exemplary example, the present invention may be applied to a notebook, a PDA, a portable multimedia player, a camcorder, a camera, a navigator and an equivalent thereof; however, the present invention is not limited thereto.

Figure 4:
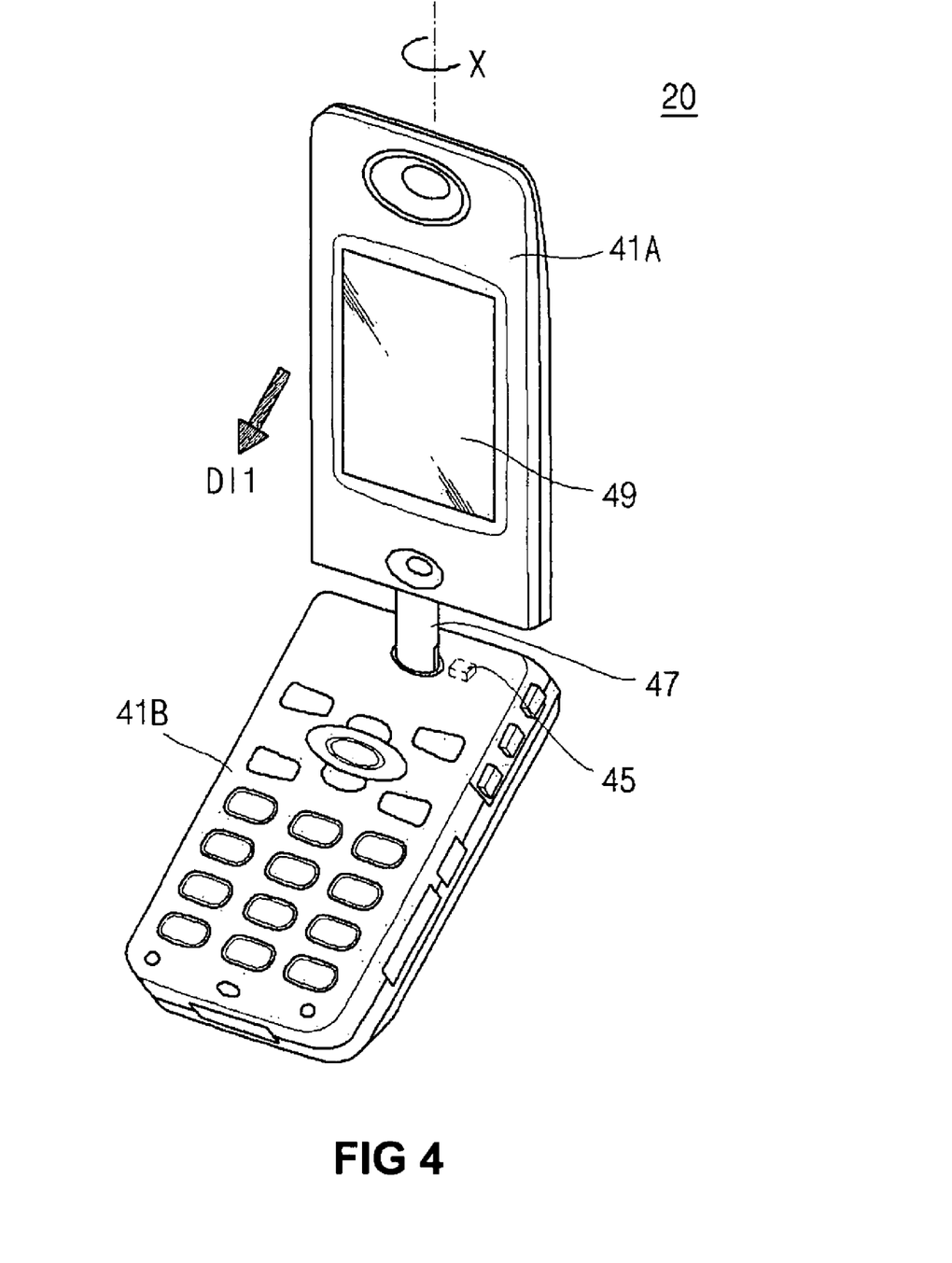
FIG. 4 is an exemplary diagram illustrating a method of detecting display direction in the case where a body including a display rotates.

FIG. 4 is an exemplary diagram illustrating an input of the selection order SO by a user and a method of detecting a display direction in the case where a body including a display rotates.

In FIG. 4, an example in which a first body 41A of a mobile phone rotates is depicted. As depicted in the figure, in the case where the first body 41A of the mobile phone rotates, it is important to determine which display is positioned toward the user's direction. Especially, in the case of a portable electronic device using a battery as a power source, unnecessary use of accessory devices causes a waste of power. Accordingly, reducing the power consumption becomes a major factor for ensuring a long-term operation. That is, it is necessary to determine which display is positioned toward the user's direction so as to suspend the operation of the panel of the display that is not positioned toward the user's direction.

For this purpose, the portable electronic device 20 may include a direction detection unit. A direction detection unit, embodied using a rotation detection sensor 45 detecting the rotation of a shaft 47, is depicted in FIG. 4; however, the present invention is not limited thereto.

The first body 41A of the portable electronic device 20 depicted in FIG. 4 is connected to a second body 41B by a shaft 47 to be rotated as marked by arrow X. If the first body 41A rotates, the light-emitting direction of a first panel 49 is changed along with the rotation. For example, if the first body 41A rotates 180 degrees, a second panel established in the rear thereof, not depicted, is positioned toward the key pad. In this case, it is desired to drive the second panel, whereas the operation of the first panel should be suspended. That is, if the first body 41A rotates, the rotation detection sensor 45 detects the rotation of the first body 41A and transmits the information on the rotation of the first body 41A, by way of the central processing unit of the portable electronic device 20 or directly, to the selection circuit. As a result, the selection circuit and the switch control unit control the operations of the first panel 49 and the second panel. Moreover, the direction detection unit depicted in FIG. 4 may be realized in the same manner as the closing detection unit of FIGS. 3A and 3B; however, the present invention is not limited thereto. Furthermore, the rotation detection sensor proposed as the direction detection unit is an exemplary example; however, the present invention is not limited thereto.

Figure 5:
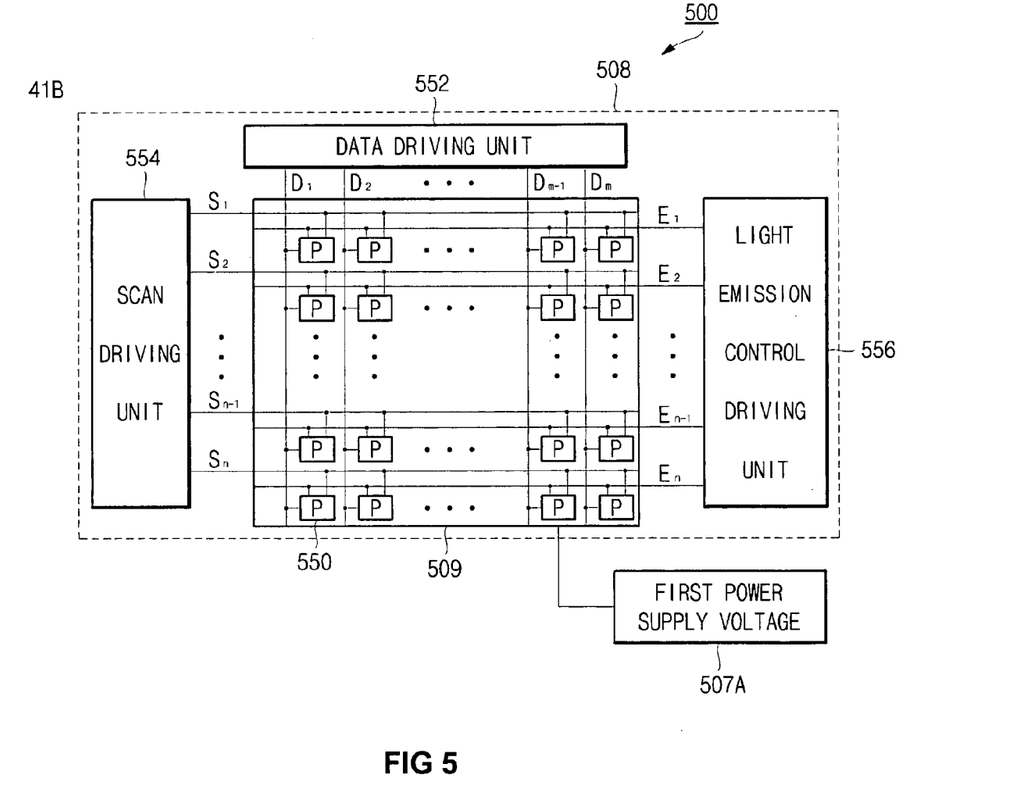
FIG. 5 is a schematic diagram depicting a connection state between a pixel array and a driving unit in the case where an EL panel is used in FIGS. 1 and 2.

FIG. 5 is a schematic diagram depicting a connection state between a pixel array and a driving unit in a case where an EL panel is used in FIGS. 1 and 2.

Referring to FIG. 5, an organic light emitting diode 500 includes a data driving unit 552, a scan driving unit 554, a light emission control driving unit 556, a display panel 509 and a first power supply voltage 507A. Here, the second panel, second power supply voltage, first power supply unit, second power supply unit, switch control unit and selection circuit are not depicted. Moreover, the light emission control driving unit 556 is depicted exemplarily in FIG. 5 and it is possible to eliminate the light emission control driving unit 556 according to an organic light emitting pixel 550.

The data driving unit 552 may supply data signals to the panel 509 through a plurality of data lines D1 to Dm. The scan driving unit 554 may supply scan signals to the panel 509 sequentially through a plurality of scan lines S1 to Sn. Moreover, the light emission control driving unit 556 may supply light emission control signals to the panel 509 through a plurality of light emission control lines E1 to En. To this end, the plurality of scan lines S1 to Sn and the plurality of light emission control lines E1 to En may be arranged in the vertical direction on the panel 509, the plurality of data lines D1 to Dm may be arranged in the horizontal direction on the panel 509, and a pixel (P) 550 may be formed at each intersection thereof. Here, the wiring of the horizontal and vertical directions is only an example and such an array may be varied according to the arrangement of the driving units.

Meanwhile, as depicted in FIG. 5, the scan driving unit 554, the data driving unit 552, the light emission control driving unit 556, the panel 509 and the first power supply voltage 507A may all be formed on a single substrate 508. In particular, the driving units 552, 554 and 556 and the first power supply voltage 507A may be formed in an integrated circuit on a single substrate 508. Moreover, the driving units 552, 554 and 556 and the first power supply voltage 507A may be formed on the same substrate where the data lines D1 to Dm, the scan lines S1 to Sn, the light emission control lines E1 to En and transistors, not depicted, established on the organic light emitting pixels 550, are arranged; however, the present invention is not limited thereto. Furthermore, the driving units 552, 554 and 556 and the first power supply voltage 507A may be established in the form of a tape carrier package TCP, a flexible printed circuit FPC, a tape automatic bonding TAB, a chip on glass COG or an equivalent thereof, electrically coupled to the substrate 508; however, the present invention is not limited thereto.

Figure 6:
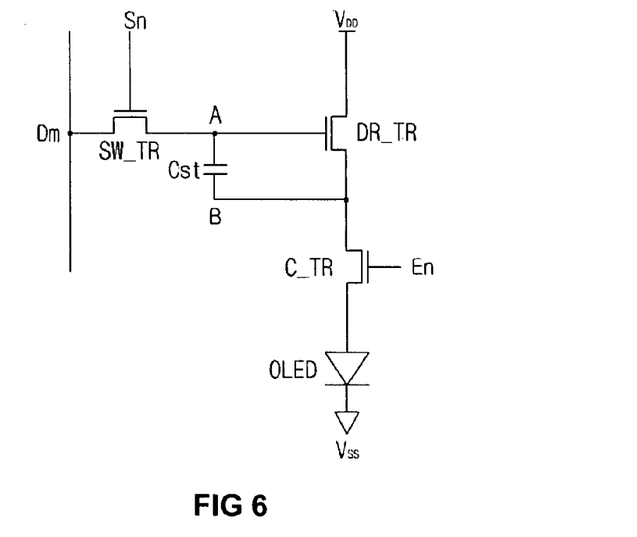
FIG. 6 is an exemplary diagram depicting a pixel formed on a pixel array to illustrate an organic light emitting pixel of FIG. 5.

FIG. 6 is an exemplary diagram depicting a pixel formed on a pixel array to illustrate the organic light emitting pixel of FIG. 5.

Referring to FIG. 6, the organic light emitting diode 550 may include a data line Dm supplying a data signal, a scan line Sn supplying a scan signal, a light emission control line En supplying a light emission signal, a first positive power supply line VDD supplying a first positive voltage VDD1 as a first power supply voltage, a first negative power supply line VSS supplying a first negative voltage VSS1 as a first power supply voltage, a driving transistor DR_TR, a switching transistor SW_TR, a light emission control transistor C_TR, a storage element Cst and an organic light emitting diode OLED. Moreover, the pixel circuit depicted in FIG. 6 is only an example, and the number and the arrangement of the transistors and the storage elements may be variously changed, and the present invention is not limited thereto. Furthermore, although N-channel transistors are exemplarily depicted in FIG. 6, it is possible to apply P-channel transistors. In the case where the P-channel transistors are applied thereto, a second electrode of the storage element may be coupled to a second electrode of the driving transistor DR_TR.

The scan line Sn supplies a scan signal for selecting an organic light emitting diode OLED to be turned on to a control electrode of the switching transistor SW_TR. The data line Dm supplies a data signal corresponding to a luminescent brightness to a first electrode A of the storage element Cst and a control electrode of the driving transistor DR_TR. Here, the data signal may be provided in the form of a voltage; however, the present invention is not limited thereto. Moreover, the light emission control line En is electrically coupled to a control electrode of the light emission control transistor C_TR so as to control the light emitting time of the organic light emitting diode OLED.

A first electrode, i.e., the control electrode, of the switching transistor SW_TR is connected to the scan line Sn and a second electrode (drain electrode or source electrode) thereof is coupled to the data line Dm. A third electrode (source electrode or drain electrode) of the switching transistor SW_TR is electrically coupled to the control electrode of the driving transistor DR_TR and the first electrode A of the storage element Cst. Such a switching transistor SW_TR may be an N-channel transistor. In this case, if a scan signal of high level is applied to the control electrode through the scan line Sn, the switching transistor is turned on and supplies a data signal to the first electrode A of the storage element Cst and the control electrode of the driving transistor DR_TR.

The control electrode of the driving transistor DR_TR is coupled to the third electrode of the switching transistor SW_TR and the first electrode A of the storage element Cst, a second electrode (source electrode or drain electrode) is connected to the first positive power supply line VDD, and a third electrode (drain electrode or source electrode) is electrically coupled to a second electrode B of the storage element Cst and a second electrode of the light emission control transistor C_TR. The driving transistor DR_TR may also be an N-channel transistor. In this case, the driving transistor DR_TR is turned on by a data signal of high level supplied from the data line Dm as the switching transistor SW_TR is turned on. The driving transistor DR_TR turned on by the switching transistor SW_TR supplies a predetermined amount of current from the first positive power supply line VDD to the organic light emitting diode OLED. Here, the data signal of high level is applied to the first electrode A of the storage element Cst so as to charge the storage element Cst, and thereby the driving transistor DR_TR is turned on for a predetermined time by the storage element Cst, even if the switching transistor SW_TR is turned on.

Figure 7:
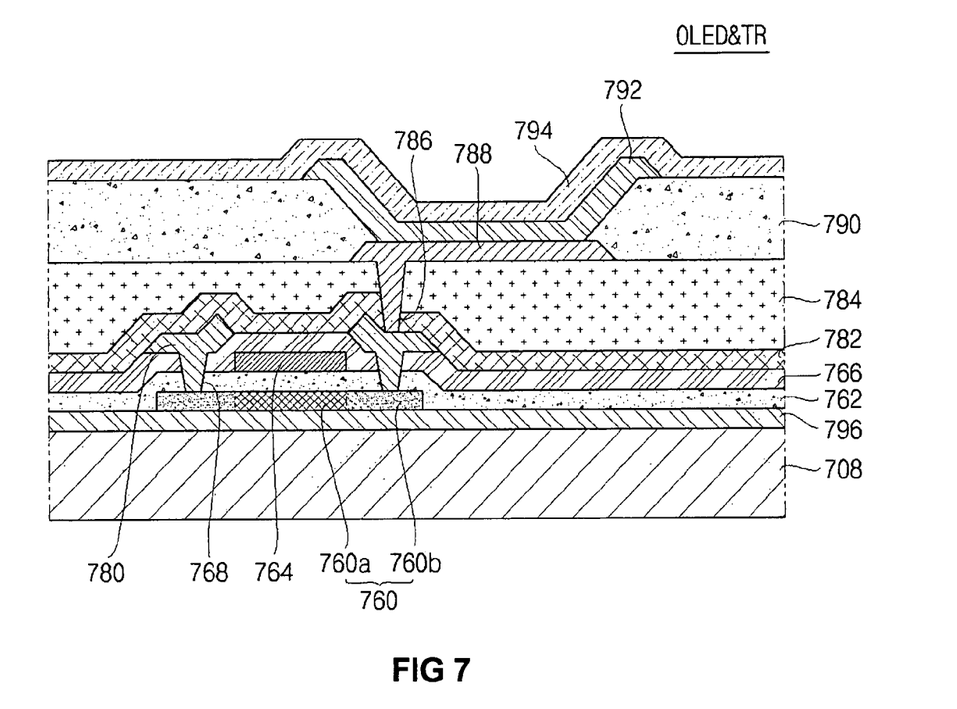
FIG. 7 is an exemplary cross sectional view depicting a section of a transistor and an organic light emitting diode of FIG. 6.

FIG. 7 is an exemplary cross sectional view depicting a section of a transistor and an organic light emitting diode of FIG. 6. Herein, the description will be made giving an example of a top-emitting OLED.

Referring to FIG. 7, a buffer layer 796 is formed on a substrate 708. Here, the substrate 708 may be formed of glass, plastic or an equivalent thereof, and may be formed of stainless steel, aluminum, aluminum alloy or an equivalent thereof; however, the present invention is not limited thereto. Moreover, the buffer layer 796 may be formed of a silicon oxide layer, a silicon nitride layer, an inorganic insulating layer or an equivalent thereof; however, the present invention is not limited thereto.

After the formation of the buffer layer 796, a semiconductor layer 760 is formed at a predetermined area on the buffer layer 796. Here, the semiconductor layer 760 may be a polycrystalline layer and, in this case, the polycrystalline layer may be provided by forming an amorphous silicon layer and then crystallizing the amorphous silicon layer; however, the present invention is not limited thereto. Moreover, the semiconductor layer 760 may be divided into a gate region 760a and a source-drain region 760b by doping. The doping may be performed after forming a gate electrode 764; however, the present invention is not limited thereto. The source-drain region 760b is electrically coupled to a source-drain electrode 780.

Following the formation of the semiconductor layer 760, a gate insulating layer (or a first insulating layer) 762 is formed on the buffer layer 796 to cover the semiconductor layer 760. The gate insulating layer 762 is established to prevent a short circuit between electrodes and the semiconductor layer 760. The gate insulating layer 762 may be a silicon oxide layer, a silicon nitride layer, an inorganic insulating layer or an equivalent thereof; however, the present invention is not limited thereto.

If the gate insulating layer 762 is formed, a gate electrode 764 is established on the gate insulating layer 762. The gate electrode 764 is provided at an area overlapping with the gate region 760a of the semiconductor layer 760, and may be formed of Al, AlNd, Cr, Cu, MoW, Ti, Al alloy, Cu alloy, Mo alloy or an equivalent thereof; however, the present invention is not limited thereto.

After the formation of the gate electrode 764, an interlayer insulating layer (or a second insulating layer) 766 is formed on the gate insulating layer 762 so as to cover the gate electrode 764. The interlayer insulating layer 766 may be formed of a silicon oxide layer, a silicon nitride layer, an inorganic insulating layer, an organic insulating layer or an equivalent thereof; however, the present invention is not limited thereto.

Following the formation of the interlayer insulating layer 766, a source-drain electrode 780 is formed on the interlayer insulating layer 766. Here, the source-drain electrode 780 is established so as to overlap with the source-drain region 760b of the semiconductor layer 760. And the source-drain electrode 780 is electrically coupled to the source-drain region 760b by a contact hole 768 formed so as to penetrate the gate insulating layer 762 and the interlayer insulating layer 766. The source-drain electrode 780 may be formed of the same material as the gate electrode 764 as described above; however, the present invention is not limited thereto.

If the source-drain electrode 780 is formed, a passivation layer (or a third insulating layer) 782 is formed on the interlayer insulating layer 766 so as to cover the source-drain electrode 780. The passivation layer 782 may be formed of a silicon oxide layer, a silicon nitride layer, an inorganic insulating layer, or an equivalent thereof; however, the present invention is not limited thereto.

After the formation of the passivation layer 782, a planarization layer 784 is formed on the passivation layer 782. The planarization layer 784 may be formed of an organic material as well as an inorganic material.

Following the formation of the planarization layer 784, a lower electrode 788 is formed at a predetermined area on the planarization layer 784. The lower electrode 788 is electrically coupled to the source or drain electrode 780 by a via hole 786 formed so as to penetrate the planarization layer 784 and the passivation layer 782. The lower electrode 788 may be formed of an opaque metal in the case of a top-emitting type, whereas, the lower electrode 788 may be a transparent electrode in the case of a bottom-emitting type. Moreover, in the case of the top-emitting type, the lower electrode 788 may further include a reflecting metal layer; however, the present invention is not limited thereto.

Then, a pixel separation layer 790 is formed on the planarization layer 784 and an organic light emitting diode 792 is formed on the lower electrode 788. Moreover, an upper electrode 794 is formed over the pixel separation layer 790 and the organic light emitting diode 792. Here, the upper electrode 794 may be a transparent electrode in the case of the top-emitting type, whereas, the upper electrode 794 may be formed of an opaque metal or an alloy in the case of the bottom-emitting type. Moreover, in the case of the bottom-emitting type, the upper electrode 794 may further include a reflecting metal layer; however, the present invention is not limited thereto.

In the case where the thin film transistor is formed using polycrystalline silicon as described above, crystallization methods are generally used.

The crystallization methods include excimer laser annealing (ELA) using an excimer laser, metal induced crystallization (MIC) using a crystallization promoting material, solid phase crystallization, high-pressure annealing (HPA) in which the crystallization is performed under hot and humid conditions, sequential lateral solidification (SLS) using a mask in addition to the existing ELA method, and so on.

Among them, the excimer laser annealing (ELA) method has been widely used since it can directly apply the existing crystallization method for the polycrystalline liquid crystal display device, its processing method is simple, and the technique for the processing method has been completely developed.

The metal induced crystallization (MIC) method is one of the methods that can perform the crystallization at low temperature without using the ELA method, in which a crystallization promoting material such as Co, Ni, Pd, Ti, etc. is deposited or spin-coated on the surface of an amorphous silicon (a-Si) layer at an initial stage so as to infiltrate into the amorphous silicon layer and change the phase of the amorphous silicon, thus crystallizing the amorphous silicon layer.

Another metal induced crystallization (MIC) method is a metal induced lateral crystallization (MILC) method that has an advantage in that it can effectively prevent a contaminant, such as nickelsilicide, from entering a specific area of the thin film transistor using a mask during the process of forming the metal induced layer on the surface of the amorphous silicon layer. The mask used in the MILC method may be a shadow mask and the shadow make may be a linear shape or a spot shape.

Still another metal induced crystallization (MIC) method is a metal induced crystallization with capping layer (MICC) method in which a capping layer is formed so as to control the amount of the promoting metal introduced into the amorphous silicon layer prior to the process of depositing or spin-coating the promoting material layer. The capping layer thus formed may be a silicon nitride layer. The amount of the promoting material introduced from the promoting metal layer to the amorphous silicon layer is varied according to the thickness of the silicon nitride layer. The promoting material introduced into the silicon nitride layer may be formed all over the silicon nitride layer, or it may be selectively formed using a mask such as a shadow mask. After the crystallization of the polycrystalline silicon by the promoting material, the capping layer may be selectively removed.

Such a method of removing the capping layer may include a wet etching method or a dry etching method. The contact hole formed to penetrate the interlayer insulating layer has been mentioned in the above description of the transistor structure. After the formation of the contact hole and before the formation of the source-drain electrode, it is possible to inject impurities through the contact hole to remove the remaining promoting material impurities, which is called the Gattering process. Other than the impurity injection process, the Gattering process further includes a heating process of heating the thin film transistor at low temperature. Through such a Gattering process, it is possible to realize a thin film transistor having excellent characteristics.

Moreover, there is a micro silicon having a grain size between the amorphous silicon and the polycrystalline silicon.

In general, the micro silicon has a grain size within a range of 1 nm to 100 nm. The micro silicon has characteristics in which the electron mobility thereof is within a range of 1 to 50 and the hole mobility is within a range of 0.01 to 0.2. Moreover, the grain size of the micro silicon is smaller than that of the polycrystalline silicon. Since a protruding region between the grains of the micro silicon is formed smaller than that of the polycrystalline silicon, electrons can travel more easily, thus showing uniform characteristics. Crystallization methods of the micro silicon include a thermal crystallization method and a laser crystallization method. The thermal crystallization method includes a crystallization process performed simultaneously with the deposition of the amorphous silicon and a reheating process.

Figure 8:
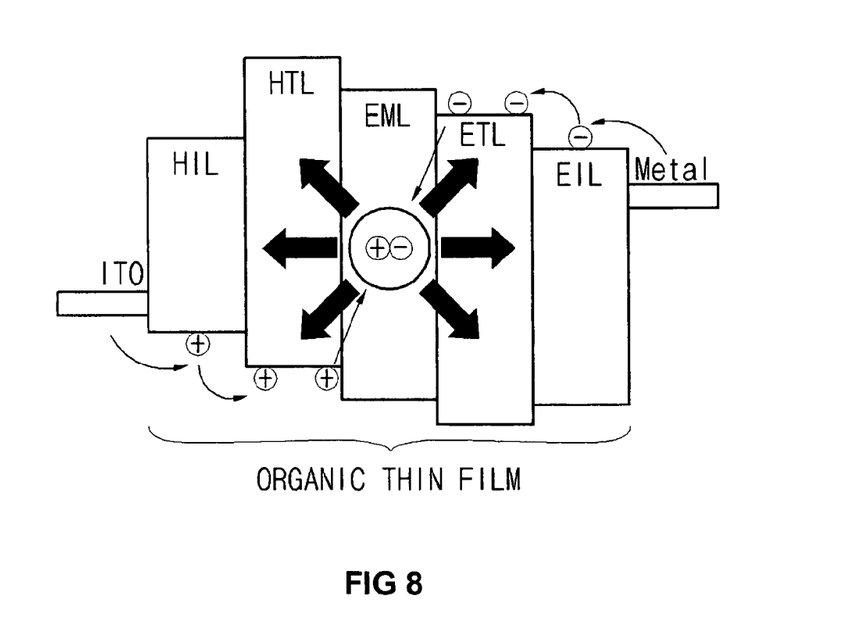
FIG. 8 is a schematic diagram depicting a layer structure of the organic light emitting diode OLED of FIG. 7.

FIG. 8 is a schematic diagram depicting a layer structure of the organic light emitting diode OLED of FIG. 7.

The organic light emitting diode may include an anode, an organic layer and a cathode. The organic layer may be composed of an emitting layer EML, in which electrons (−) and holes (+) are recombined to form excitons to emit light, an electron transport layer ETL transporting electrons and a hole transport layer HTL transporting holes. Here, the emitting layer EML may be divided into a fluorescent organic light emitting diode, a phosphorescent organic light emitting diode, and a mixed organic light emitting diode according to the materials forming the emitting layer. Moreover, an electron injecting layer EIL for injecting electrons may be established on a surface of the electron transport layer ETL and a hole injecting layer HIL for injecting holes may be further provided on a surface of the hole transport layer. Furthermore, in the case of the phosphorescent organic light emitting diode, a hole blocking layer HBL may be selectively formed between the emitting layer EML and the electron transport layer ETL, and an electron blocking layer EBL may be selectively established between the emitting layer EML and the hole transport layer HTL. Here, the host material for fluorescent dyes used in the emitting layer EML may be at least one of an alumiquinoline complex Alq3, a beryllium-quinoline complex BeBq2, Almq(4-methyl-8-hdyroxyquinoline), BAlq, hydroxyphenyloxazole, hydroxyphenylthiazole (Zn-PBO, ZNPBT), an azomethine metal complex, a distyrylbenzene derivative, a DTVBi derivative, a DSB derivative or an equivalent thereof. Moreover, the guest material for the fluorescent dyes used in the emitting layer EML may be at least one of a coumarin derivative, DCM, quinacridone, a rubrene derivative, perylene, DPT, PMDFB, BTX, ABTX, DCJT or an equivalent thereof; however, the present invention is not limited thereto. The phosphorescent material may be at least one of $Btp_2Ir(acac)$, $Ir(ppy)_3$, $Ir(thpy)_3$, $Ir(t5m-thpy)_3$, $Ir(t-5CF_3-py)_3$, $Ir(t-5t-py)_3$, $Ir(mt-5mt-py)_3$, $Ir(btpy)_3$, $Ir(tflpy)_3$, $Ir(piq)_3$, an Ir compound containing $Ir(tiq)_3$, platinum, aurum, osmium, Ru, a Re complex, or an equivalent thereof.

Moreover, the organic layer may be formed in a slim organic light emitting diode structure in which two kinds of layers are mixed with each other to reduce the thickness. For example, a hole injection transport layer HITL structure in which the hole injecting layer HIL and the hole transport layer HTL are simultaneously established, and an electron injection transport layer EITL in which the electron injecting layer EIL and the electron transport layer ETL are simultaneously formed, may be selectively provided. The slim organic light emitting diode aims at improving the luminescent efficiency.

Furthermore, a buffer layer may be selectively formed between the anode and the emitting layer EML. The buffer layer may be classified into an electron buffer layer for buffering electrons and a hole buffer layer for buffering holes. The electron buffer layer may be selectively formed between the cathode and the electron injecting layer EIL and act on behalf of the electron injecting layer EIL. In this case, a stack structure of the organic layer may be emitting layer EML/electron transport layer ETL/electron buffer layer/cathode. Moreover, the hole buffer layer may be selectively formed between the anode and the hole injecting layer EIL and act on behalf of the hole injecting layer HIL. Here, a stack structure of the organic layer may be anode/hole buffer layer/hole transport layer HTL/emitting layer EML.

Available stack structures of the organic layer are as follows:

(A) Normal Stack Structure

A-1) anode/hole injecting layer/hole transport layer/emitting layer/electron transport layer/electron injecting layer/cathode;

A-2) anode/hole buffer layer/hole injecting layer/hole transport layer/emitting layer/electron transport layer/electron injecting layer/cathode;

A-3) anode/hole injecting layer/hole transport layer/emitting layer/electron transport layer/electron injecting layer/electron buffer layer/cathode;

A-4) anode/hole buffer layer/hole injecting layer/hole transport layer/emitting layer/electron transport layer/electron injecting layer/electron buffer layer/cathode;

A-5) anode/hole injecting layer/hole buffer layer/hole transport layer/emitting layer/electron transport layer/electron injecting layer/cathode; and A-6) anode/hole injecting layer/hole transport layer/emitting layer/electron transport layer/electron buffer layer/cathode.

(B) Normal Slim Structure

B-1) anode/hole injection transport layer/emitting layer/electron transport layer/electron injecting layer/cathode;

B-2) anode/hole buffer layer/hole injection transport layer/emitting layer/electron transport layer/electron injecting layer/cathode;

B-3) anode/hole injecting layer/hole transport layer/emitting layer/electron injection transport layer/electron buffer layer/cathode;

B-4) anode/hole buffer layer/hole transport layer/emitting layer/electron injection transport layer/electron buffer layer/cathode;

B-5) anode/hole injection transport layer/hole buffer layer/emitting layer/electron transport layer/electron injecting layer/cathode; and B-6) anode/hole injecting layer/hole transport layer/emitting layer/electron buffer layer/electron injection transport layer/cathode.

(C) Inverted Stack Structure

C-1) cathode/electron injecting layer/electron transport layer/emitting layer/hole transport layer/hole injecting layer/anode;

C-2) cathode/electron injecting layer/electron transport layer/emitting layer/hole transport layer/hole injecting layer/hole buffer layer/anode;

C-3) cathode/electron buffer layer/electron injecting layer/electron transport layer/emitting layer/hole transport layer/hole injecting layer/anode;

C-4) cathode/electron buffer layer/electron injecting layer/electron transport layer/emitting layer/hole transport layer/hole buffer layer/anode;

C-5) cathode/electron injecting layer/electron transport layer/emitting layer/hole transport layer/hole buffer layer/hole injecting layer/anode; and C-6) cathode/electron injecting layer/electron buffer layer/electron transport layer/emitting layer/hole transport layer/hole injecting layer/anode.

(D) Inverted Slim Structure

D-1) cathode/electron injecting layer/electron transport layer/emitting layer/hole injecting transport layer/anode;

D-2) cathode/electron injecting layer/electron transport layer/emitting layer/hole injection transport layer/hole buffer layer/anode;

D-3) cathode/electron buffer layer/electron injection transport layer/emitting layer/hole transport layer/hole injecting layer/anode;

D-4) cathode/electron buffer layer/electron injection transport layer/emitting layer/hole transport layer/hole injecting layer/anode;

D-5) cathode/electron injecting layer/electron transport layer/emitting layer/hole buffer layer/hole injection transport layer/anode; and D-6) cathode/electron injection transport layer/electron buffer layer/emitting layer/hole transport layer/hole injecting layer/anode.

As above, it is possible to selectively use the stack structures of various forms.

As described above, the portable electronic device in accordance with the present invention can selectively drive two display panels by a switch control unit for controlling power supply units supplying power to the display panels, thus minimizing the power consumption of the portable electronic device.

Moreover, the portable electronic device in accordance with the present invention can prevent a malfunction of one display panel caused by the operation of another display panel by selectively driving two display panels, thus improving the reliability of the product.

Furthermore, the portable electronic device in accordance with the present invention includes a selection circuit for selectively driving switch control units and varies the input of the selection circuit, thus configuring a most suitable portable electronic device providing for operation of the display panels in accordance with the intended use and environment.

In addition, the portable electronic device in accordance with the present invention makes it possible to select and use a most suitable panel according to a device to which the display panel is applied and the use environment thereof, thus increasing the reliability of the product and the user's convenience.

As above, preferred embodiments of the present invention have been described and illustrated. However, the present invention is not limited thereto. Rather, it should be understood that various modifications and variations of the present invention can be made thereto by those skilled in the art without departing from the spirit and the technical scope of the present invention as defined by the appended claims.

What is claimed is:

1. A portable display device, comprising:
a first panel for emitting light in a first direction;
a second panel for emitting light in a second direction;

a substrate disposed between the first panel and the second panel;

a first power supply unit for applying a power supply voltage to the first panel;

a second power supply unit for applying a power supply voltage to the second panel;

a switch control unit for selectively controlling the first power supply unit and the second power supply unit;

a first positive power supply voltage unit electrically coupled to the first power supply unit and for applying a positive power supply voltage to the first panel;

a second positive power supply voltage unit electrically connected to the second power supply unit for applying a positive power supply voltage to the second panel;

a first negative power supply voltage unit electrically coupled to the first power supply unit for applying a negative power supply voltage to the first panel; and a second negative power supply voltage unit electrically connected to the second power supply unit for applying a negative power supply voltage to the second panel;

wherein any one of the first panel and the second panel is an organic light emitting diode; and wherein the first negative power supply voltage unit and the second negative power supply voltage unit are electrically coupled to each other.

2. The portable electronic device as recited in claim 1, wherein the switch control unit comprises:

a first switch control unit for independently controlling the first power supply unit; and a second switch control unit for independently controlling the second power supply unit.

3. The portable electronic device as recited in claim 2, further comprising a selection circuit electrically coupled to the first switch control unit and the second switch control unit for selecting the first switch control unit and the second switch control unit.

4. The portable electronic device as recited in claim 3, wherein the selection circuit selects one of the first switch control unit and the second switch control unit according to a selection order provided by a user.

5. The portable electronic device as recited in claim 3, further comprising a direction detection unit for detecting a light-emitting direction of one of the first panel and the second panel.

6. The portable electronic device as recited in claim 5, wherein the selection circuit selects one of the first switch control unit and the second switch control unit according to an output of the direction detection unit.

7. The portable electronic device as recited in claim 3, further comprising a first body and a second body connected to the first body by a shaft, the first body and the second body being rotated by the shaft so as to be folded together;

wherein one of the first panel and the second panel is established on the first body so that the light-emitting direction is toward a surface where the first body and the second body are folded together.

8. The portable electronic device as recited in claim 7, wherein one of the first body and the second body further comprises a closing detection unit for detecting the closing of the first body and the second body.

9. The portable electronic device as recited in claim 8, wherein the selection circuit selects one of the first switch control unit and the second switch control unit according to an output of the closing detection unit.

10. The portable electronic device as recited in claim 1, wherein a material of an emitting layer of the organic light emitting diode is a fluorescent material.

11. The portable electronic device as recited in claim 1, wherein a material of an emitting layer of the organic light emitting diode is a phosphorescent material.

12. The portable electronic device as recited in claim 1, further comprising at least one polycrystalline thin film transistor for driving the organic light emitting diode.

13. The portable electronic device as recited in claim 12, wherein the polycrystalline thin film transistor is formed by a laser crystallization method.

14. The portable electronic device as recited in claim 12, wherein the polycrystalline thin film transistor is formed by a metal induced crystallization method.

15. The portable electronic device as recited in claim 12, wherein the polycrystalline thin film transistor is formed by a high-pressure annealing method.

* * * * *